United States Patent [19]

Asaida

[11] Patent Number: 5,043,803
[45] Date of Patent: Aug. 27, 1991

[54] SIGNAL PROCESSING CIRCUIT FOR A SOLID-STATE IMAGE PICKUP DEVICE

[75] Inventor: Takashi Asaida, Kanagawa, Japan

[73] Assignee: Sony Corporation, Tokyo, Japan

[21] Appl. No.: 433,998

[22] Filed: Nov. 9, 1989

[30] Foreign Application Priority Data

Nov. 10, 1988 [JP] Japan .................. 63-282553

[51] Int. Cl.$^5$ .............................................. H04N 9/04
[52] U.S. Cl. ......................................... 358/41; 358/50; 358/51
[58] Field of Search ........................ 358/50, 51, 41, 13

[56] References Cited

U.S. PATENT DOCUMENTS

| 4,464,685 | 8/1984 | Wilkinson | 358/13 |
| 4,506,294 | 3/1985 | Nagumo | 358/50 |

FOREIGN PATENT DOCUMENTS

| 0279647A2 | 8/1988 | European Pat. Off. |
| 62-206987 | 9/1987 | Japan . |
| 63-232780 | 9/1988 | Japan . |

Primary Examiner—John K. Peng
Assistant Examiner—Twan V. Ho
Attorney, Agent, or Firm—Hill, Van Santen, Steadman & Simpson

[57] ABSTRACT

A signal processing circuit of a solid-state imaging device has an image pickup section formed by plural solid-state image sensors including a discrete pixel array. The solid state image sensor for green-color image pickup is arrayed in the image pickup section with a spatial shift equal to one half the pixel pitch from the solid-state image sensors for red-color image pickup and the solid-state image sensors for blue-color image pickup in accordance with the spatial pixel shifting method. An optical low-pass filter having a cut-off frequency equal to fs is provided on the front surfaces of these solid-state image sensors. The green-color image pickup output signal, the red-color image pickup output signal and the blue-color image pickup output signal, produced at the solid state image sensors of the image pickup section, are subjected to A/D conversion, followed by phase processing with the sampling phases of the respective digital signals matched with one another, to produce high-quality image output signals having satisfactory modulation transfer function (MTF) characteristics and containing lesser amounts of aliasing components.

4 Claims, 8 Drawing Sheets

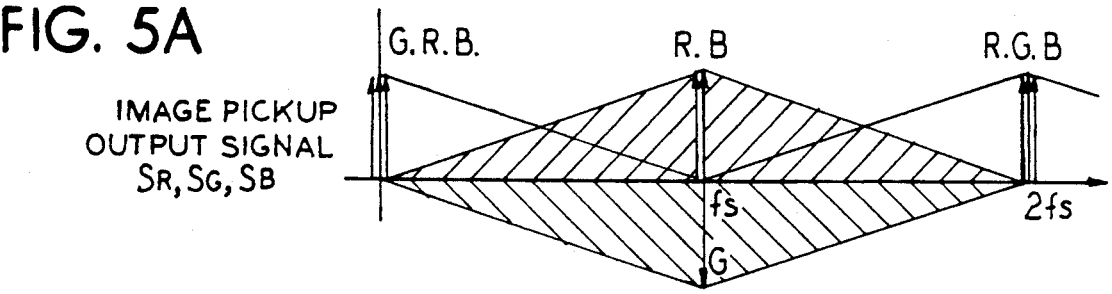
FIG. 5A IMAGE PICKUP OUTPUT SIGNAL S$_R$, S$_G$, S$_B$
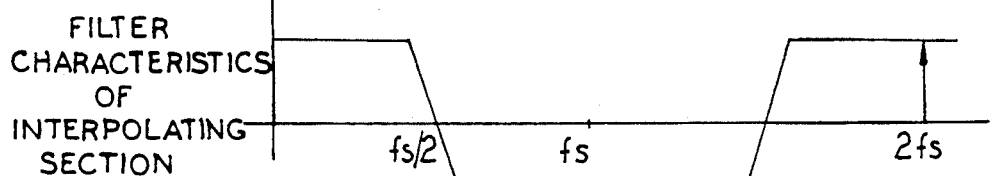
FIG. 5B FILTER CHARACTERISTICS OF INTERPOLATING SECTION
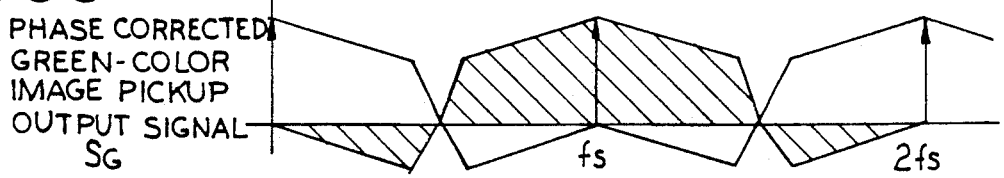
FIG. 5C PHASE CORRECTED GREEN-COLOR IMAGE PICKUP OUTPUT SIGNAL S$_G$
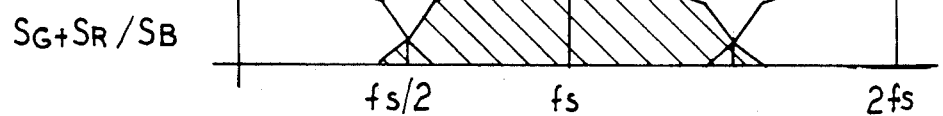
FIG. 5D S$_G$+S$_R$/S$_B$
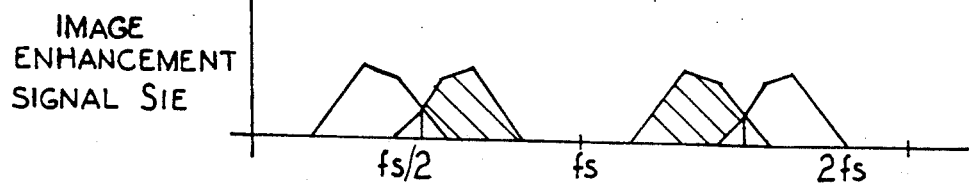
FIG. 5E IMAGE ENHANCEMENT SIGNAL S$_{IE}$
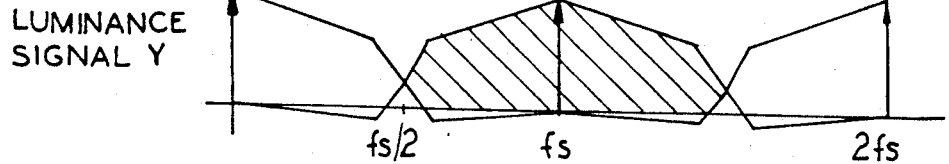
FIG. 5F LUMINANCE SIGNAL Y

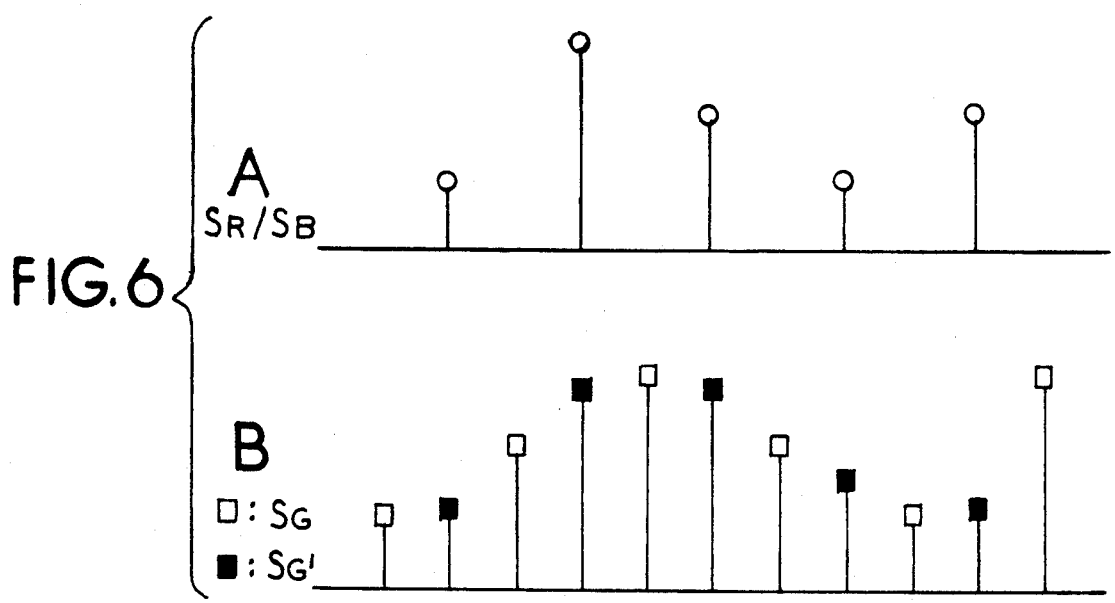
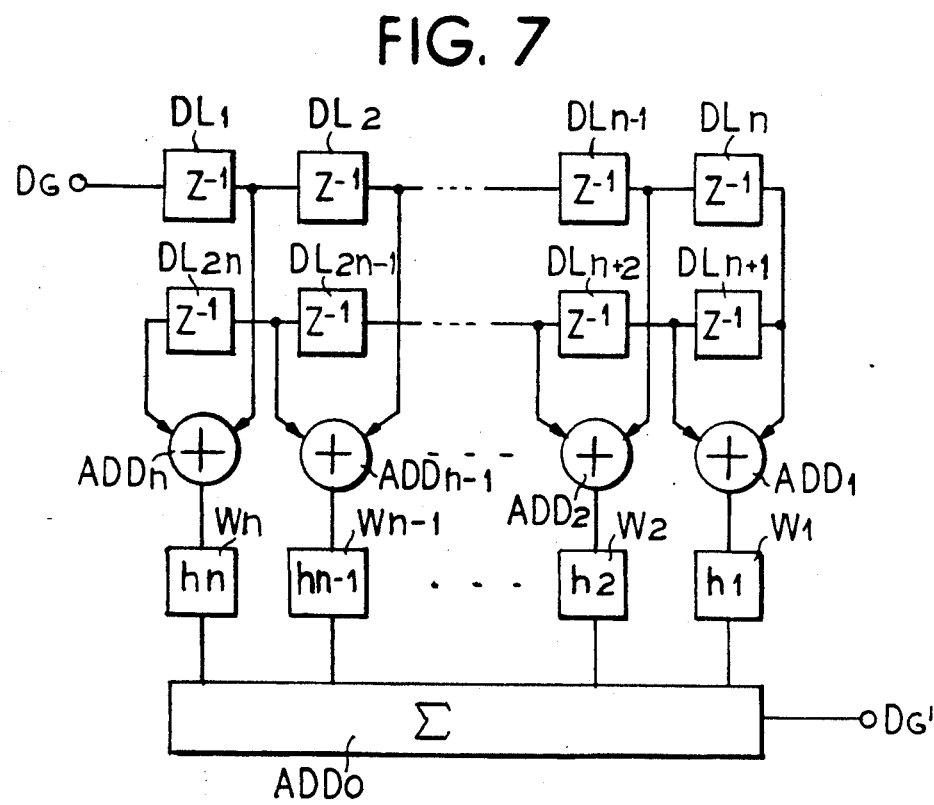

FIG.10A IMAGE PICKUP OUTPUT SIGNAL SR*,SG*,SB*
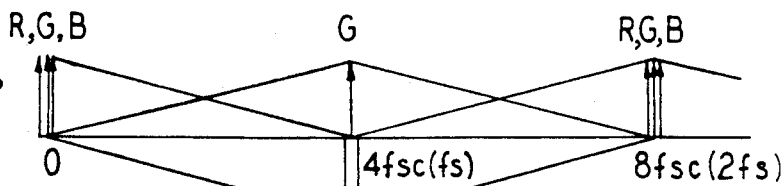
FIG.10B LUMINANCE SIGNAL Y**
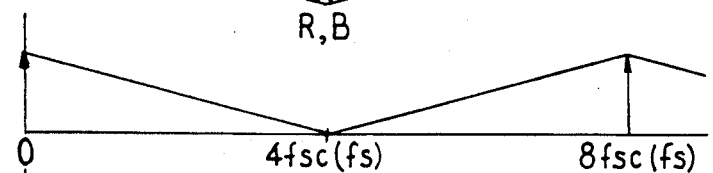
FIG.10C MODULATION OUTPUT
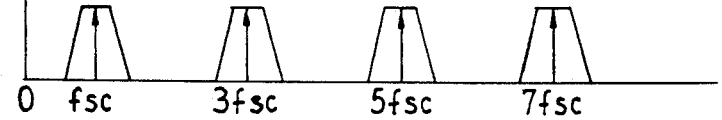
FIG.10D INTERPOLATING FILTER CHARACTERISTICS
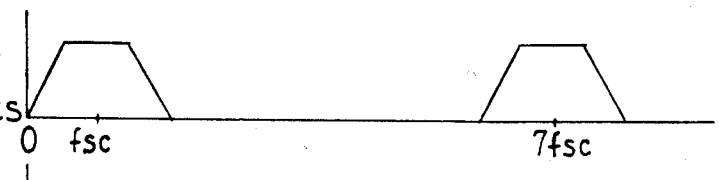
FIG.10E INTERPORATION OUTPUT
FIG.10F ADDITION OUTPUT DCS**
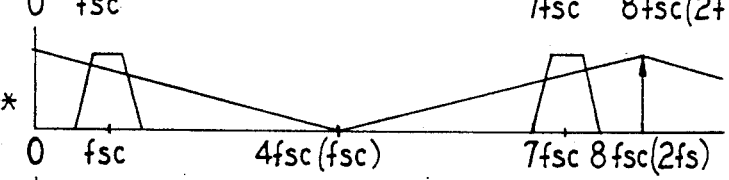
FIG.10G PRE-FILTER CHARACTERISTICS
FIG.10H PRE-FILTER OUTPUT
FIG.10I DIGITAL COMPOSITE VIDEO SIGNAL
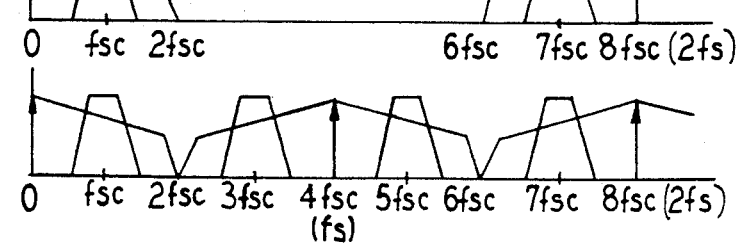

SIGNAL PROCESSING CIRCUIT FOR A SOLID-STATE IMAGE PICKUP DEVICE

BACKGROUND OF THE INVENTION

1. Field of the Invention

This invention relates to a signal processing circuit of a solid-state image pickup device an image pickup section of which includes a plurality of solid state image sensors each having a discrete pixel array.

2. Related Art Statement

In a solid-state image pickup device the image pickup section of which includes solid-state image sensors each having a discrete pixel array formed by charge coupled devices (CCDs), aliasing components from the spatial sampling frequency fs are admixed into the image pickup output signals of the solid-state image sensors, as shown by hatched lines in FIG. 1. This is because the solid-state image sensors are of the sampling system.

The conventional practice to prevent the aliasing component from being produced into the base band of the image pickup output signal is to provide a double refraction type optical lowpass filter in the image pickup optical system to suppress the high frequency part of the baseband component of the image pickup signal to meet the Nyquist conditions of the sampling system by the solid state image sensors.

In the field of color video cameras, there are placed on the market a multi-plate type solid state image pickup device, such as a two-plate type solid state image pickup device in which three prime color images are picked up by a solid-state image sensor provided with color coding filters for red-color and blue-color pixels and a solid-state image sensor for green-color image pickup, or a three-plate type solid-state image pickup device for picking up of the three prime color images by separate color solid-state image sensors.

As a technique of improving the resolution in the multi-plate type solid-state image pickup device, there is known a so-called spatial pixel shifting method, according to which the cut-off frequency of the optical low-pass filter is selected to be fs and, as shown in FIG. 3, the solid-state image sensors for red color image pickup and blue color image pickup are placed with a shift equal to one half the spatial pixel sampling period with respect to the solid-state image sensor for green color image pickup.

By taking advantage of the spatial pixel shifting method, it becomes possible with the multi plate type analog output solid-state image pickup device to realize high resolution exceeding the limit imposed by the number of pixels of the solid state image sensor.

In service digital video tape recorders, employed in, for example, a broadcasting station, standardization of so-called D1/D2 formats are under way and digital interfaces for digital video related equipment conforming to these standards are required to be used in color television camera devices. According to the digital interface standards for the digital video related equipment, the sampling rate is set so as to be approximately equal to the sampling rate fs of the currently employed solid state image sensors.

In the solid state image pickup device the image pickup section of which includes solid state image sensors each having a discrete pixel array, such as the aforementioned CCD image sensors, a double refraction type optical low pass filter is provided in the image pickup optical system to prevent the occurence of the aliasing component into the baseband of the image pickup signal by the solid state image sensors. However, since the optical low pass filter cannot be made to have steep cut-off characteristics, the problem is presented that the modulation transfer function or MTF in the high frequency range is liable to be deteriorated in the high frequency range, as shown in FIG. 2.

Hence, in the multi-plate type solid state image pickup device for color image pickup, signal deterioration caused by the aliasing component or MTF occurs unavoidably if ordinary sampling is employed.

Meanwhile, when a digital interface for a digital video related equipment is loaded on a solid state imaging device, the image pickup section of which includes solid state image sensors each having a discrete pixel array, such as the CCD image sensors, the digital rate is too high with the sampling rate of the digital interface of 2fs, while the conformity to the digital interface standards cannot be achieved. On the other hand, if the rate of the digital processing system conforming to the D1/D2 format is adopted, the resolution becomes lower than that of the conventional solid state image pickup device for analog application when directly using the analog output.

OBJECT AND SUMMARY OF THE INVENTION

It is an object of the present invention to provide a signal processing circuit in the multi-plate type solid state color image pickup device allowing to perform high-quality image pickup of a solid-state image pickup device including analog-to-digital converting means for digitizing image pickup output signals at a clock rate equal to a sampling rate fs, said image pickup output signals being read at the sampling rate fs from the solid-state image sensor for green-color image pickup and the solid-state image sensors for red-color and blue-color image pickup of the image pickup section, that are arrayed with a spatial shifting equal to one half the pixel pitch from each other; a processing circuit for processing the digital output signals of the analog-to digital converting means, and color encoder means supplied with output signals of said processing circuit output signal having superior MTF characteristics and containing lesser amounts of aliasing components.

It is another object of the present invention to provide a color image pickup device in which a digital interface conforming to the standards for the digital interface related equipment is loaded on the solid state image pickup device the image pickup section of which includes solid state image sensors, each having a discrete pixel array, such as CCD image sensors, to allow to produce high-quality digital composite video signals having satisfactory MTF characteristics and containing lesser amounts of aliasing components.

It is a further object of the present invention to provide a signal processing circuit and producing digital composite video signals; whereby the high-quality digital composite video signals having superior MTF characteristics and containing lesser amounts of aliasing components may be produced.

It is a further object of the present invention to provide a signal processing circuit of a solid-state image pickup device allowing to produce high-quality digital composite video signals and analog composite video signals having superior MTF characteristics and containing lesser amounts of aliasing components.

It is yet another object of the present invention to provide a color television camera device allowing to produce high-quality digital composite video signals having superior MTF characteristics and containing lesser amounts of aliasing components.

According to one aspect of the present invention, the signal processing circuit of the solid-state image pickup device of the present invention includes analog-to-digital converting means for digitizing image pickup output signals at a clock rate equal to a sampling rate fs, said image pickup output signals being read at the sampling rate fs from the solid-state image sensor for green-color image pickup and the solid-state image sensors for red-color and blue-color image pickup of the image pickup section, that are arrayed with a spatial shifting equal to one half the pixel pitch from each other, and interpolation filter means formed by a digital filter defined by the same clock rate as that of the analog-to-digital converting means, said interpolation filter means having a single zero for the green-color image pickup output signal or the red-color image pickup output signal and the blue-color image pickup output signal and having the passband in the vicinity of 0 to fs/2, wherein the green-color image pickup output signal or the red-color and blue-color image pickup output signals, digitized by the analog-to-digital converting means, are subjected at the interpolation filter means to sampling phase conversion, and wherein the green-color image pickup output signal or the red-color image pickup output signal and the blue-color image pickup output signal which have undergone the above mentioned sampling phase conversion on the one hand and the red-color image pickup output signal and the blue-color image pickup output signal or the green-color image pickup output signal which have not undergone the sampling phase conversion by the above mentioned interpolating filter means on the other are outputted at the same clock rate as that of the analog-to-digital conversion means.

According to another aspect of the present invention, there is provided a processing circuit for a solid-state image pickup device including analog-to-digital converting means for digitizing image pickup output signals at a clock rate equal to a sampling rate fs, said image pickup output signals being read at the sampling rate fs from the solid-state image sensor for green color image pickup and the solid-state image sensors for red color and blue-color image pickup of the image pickup section, that are arrayed with a spatial shifting equal to one half the pixel pitch from each other; a processing circuit for processing the digital output signals of the analog-to-digital converting means; and color encoder means supplied with output signals of said processing circuit and producing digital composite video signals, wherein there are provided a digital low pass filter causing the signal processing means and at least a portion of the color encoder to operate at a clock rate 2fs which is twice as high as the sampling rate fs, said low pass filter being supplied with digital composite video signals having the clock rate 2fs from the color encoder means and having the bandpass range of not more than fs/2, and rate conversion means supplied with the output of the digital low pass filter and adapted to lower the clock rate to fs, and wherein the digital composite video signal having the clock rate fs is obtained by the rate conversion means.

BRIEF DESCRIPTION OF THE DRAWINGS

FIGS. 4A and 4B illustrate modifications of the invention.

FIGS. 5A to 5F are schematic frequency diagrams for illustrating the operation of the signal processing circuit shown in FIG. 4.

FIG. 6 is similarly a schematic frequency diagram for illustrating the operation of the signal processing circuit shown in FIG. 4.

FIG. 7 is a block diagram showing an interpolating section employed in the signal processing section shown in FIG. 4.

FIGS. 10A to 10I are schematic frequency diagrams for illustrating the operation of a color television camera according to the present invention.

DETAILED DESCRIPTION OF PREFERRED EMBODIMENTS

Figure 1:
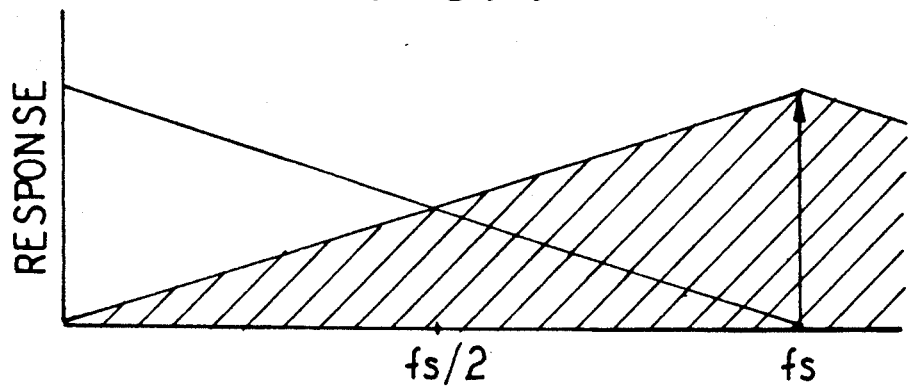
FIG. 1 is a schematic diagram for illustrating a conventional solid-state image sensor.
Figure 2:
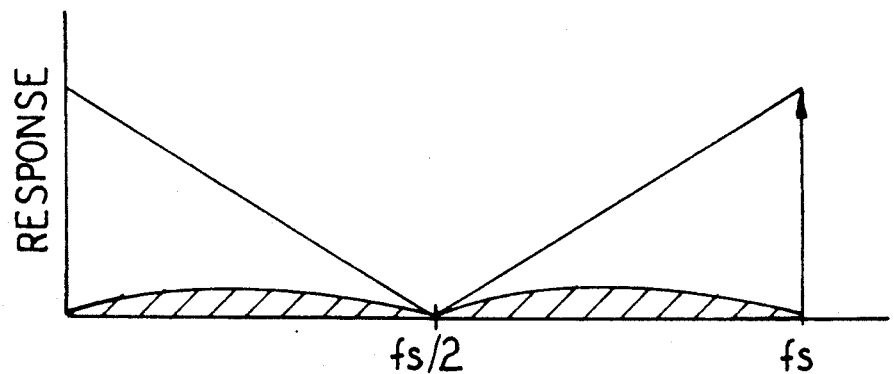
FIG. 2 is a schematic diagram for illustrating another conventional solid-state image sensor.

By referring to the drawings, a signal processing circuit of a solid-state imaging device according to a first embodiment of the present invention will be explained in detail.

Figure 4:
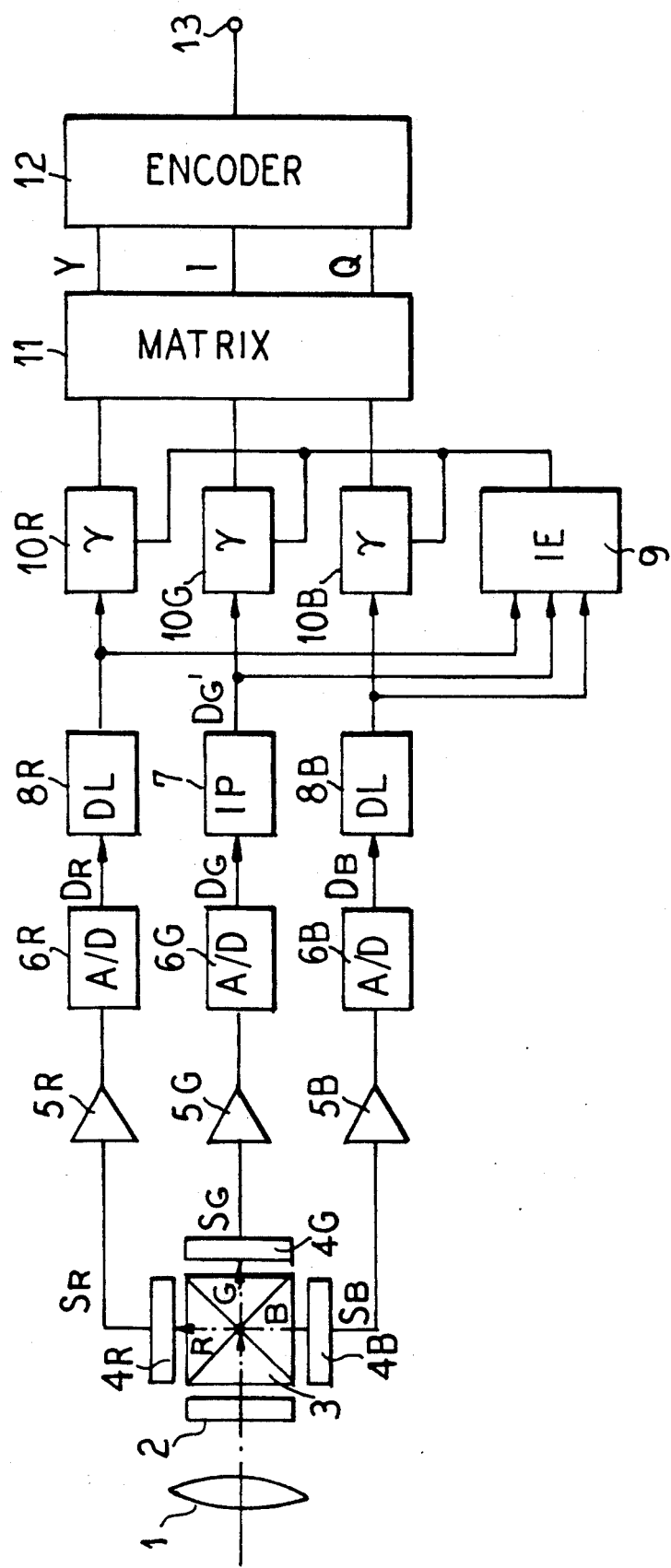
FIG. 4 is a block diagram showing the signal processing circuit of the soid state image pickup device according to the present invention.

FIG. 4 is a block diagram showing an example in which the signal processing circuit according to the present invention is applied to a three plate type solid-state image pickup device. This image pickup device is so arranged and constructed that an imaging light $L_i$ incident thereon from an imaging lens 1 by way of an optical low pass filter 2 is divided by a color separation prism 3 into three prime color components to produce three color images of an object and to form the three-color image by three CCD image sensors 4R, 4G and 4B.

Figure 3:
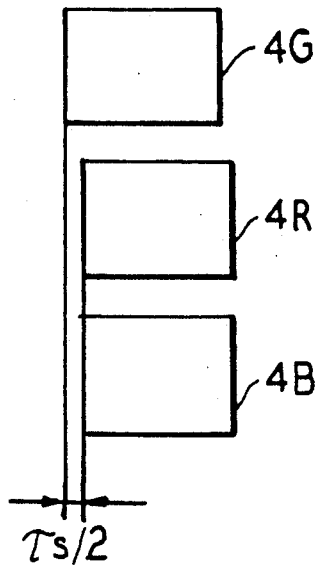
FIG. 3 is a schematic diagram showing the layout of the CCD image sensors by the pixel shifting method.

These three CCD image sensors 4R, 4G and 4B, making up the image pickup section of the three-plate solid-state image pickup device, are arranged with the use of the spatial pixel shifting method in the manner shown in FIG. 3. Thus the CCD image sensor 4R for forming the red-color image and the CCD image sensor 4B for forming the blue-color image are arranged with a shift equal to one half the spatial pixel sampling period ts with respect to the CCD image sensor 4G for forming the green-color image. The CCD image sensors 4R, 4G and 4B are driven by a CCD driving circuit, not shown, so that image pickup electrical charges of each pixel are read out with read-out clocks having a sampling frequency fs which is four times as high as the color subcarrier frequency fsc, or 4fsc.

The three color images of the object are subjected to spatial sampling at the CCD image sensor 4G for green-color image pickup on the one hand and at the CCD image sensors 4R, 4B for the red color and blue-color image pickup on the other, at the position spatially shifted by τs/2 from each other. Thus, as may be seen from the spectral components at A in FIG. 5, the sampling frequency component fs of a green-color image pickup output signal $S_G$ from the sensor 4G is oppositely phased with respect to the sampling frequency components fs of the red-color and blue-color image pickup output signals $S_R$ and $S_B$ from the sensors 4R, 4B, respectively.

The sampling timing of a red-color image pickup output signal $S_R$ by the image sensor 4R and that of a blue-color image pickup output signal $S_B$ by the CCD image sensor 4B are shown by a circle ○ at A in FIG. 6, whereas the sampling timing of a green-color image pickup output signal $S_G$ by the CCD image sensor 4G is shown by a square □ at B in FIG. 6.

The image pickup output signals $S_R$, $S_G$ and $S_B$, read out from the CCD image sensors 4R, 4G and 4B with read-out clocks having the aforementioned sampling frequency fs equal to 4fsc, are supplied to A/D converters 6R, 6G and 6B via buffer amplifiers 5R, 5G and 5B, respectively.

To the A/D converters 6R, 6G and 6B, there are applied clocks from a timing generator, not shown, at a clock rate equal to the sampling rate of each of the image pickup output signals $S_R$, $S_G$ and $S_B$, that is at the clock frequency fs which is equal to 4fsc as are the read-out clocks of the aforementioned CCD image sensors 4R, 4G and 4B.

These A/D converters 6R, 6G and 6B directly digitized the image pickup output signals $S_R$, $S_G$ and $S_B$, with the clock rate fs equal to 4fsc, to form color data $D_R$, $D_G$ and $D_B$ having the same output spectra as the spectra of the imaging output signals $S_R$, $S_G$ and $S_B$ shown at A in FIG. 5.

The green color data $D_G$ obtained at the A/D converter 6G for the green-color image pickup output signals are supplied to an interpolating section 7, where they are subjected to interpolation to produce interpolated green color data DG' which are then supplied to an image enhancement section 9 while being simultaneously supplied to a matrix processing section 11. The red color data DR produced from the A/D converter 6R for red-color image forming output signals and the blue color data $D_B$ produced from the blue-color image pickup output signals are first delayed by delaying sections 8R, 8B for a delay time equal to the time interval required in performing interpolation at the interpolating section 7, and then supplied to the image enhancement section 9 while being simultaneously supplied via processing sections 10R, 10B to the matrix processing section 11.

The green-color data $D_G$ digitized from the green-color image pickup output signal $S_G$ is subjected to interpolating arithmetic operation at the interpolating section 7, so as to be given the interpolating filtering characteristics having a single zero at fs/2 and a passband in the range from 0 to fs/2, so that the phase correction for shifting the sampling phase of the green-color image pickup output signal $S_G$ by Ts/2 is achieved without collective signal delaying. By such phase correcting operation for the green-color image pickup output signal $S_G$, the interpolating section 7 forms green-color interpolation data corresponding to the phase-corrected green-color imaging output signal $S_G'$ and having the same phase as the sampling phase of each of the red-color imaging output signal $S_R$ and the blue-color imaging output signal $S_B$.

Figure 8:
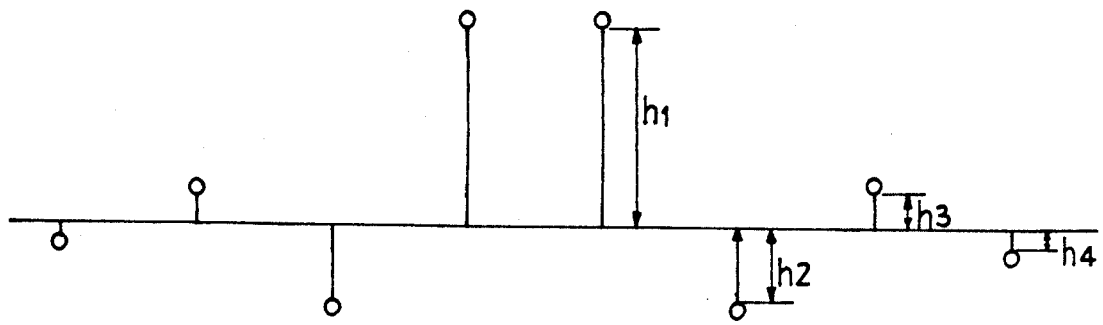
FIG. 8 is a schematic diagram showing the operation of the interpolating section shown in FIG. 7.

The interpolating section 7 is formed by a digital filter defined by the clock rate fs of the A/D converter 6G for the green color image pickup output signal. That is, as shown in FIG. 7, this interpolating section is made up mainly of a 2n-number of delay circuits $DL_1$ to $DL_{2n}$ each having a one-clock delay $2^{-1}$ in terms of the clock rate fs of the A/D converter 6G, as indicated by $$Z^{-1} = 1/fs \tag{1}$$

an n-number of adders $ADD_1$ to $ADD_n$ for adding the outputs of the delay circuits $DL_1$ to $DL_{2n}$ together, an n-number of weighting circuits $W_1$ to $W_n$ supplying weights $h_1$ to $h_n$ to the outputs of the adders $ADD_1$ to $ADD_n$ and an adder $ADD_0$ supplied with outputs of the adders $ADD_1$ to $ADD_n$ by way of the weighting circuits $W_1$ to $W_n$, for providing impulse response characteristics $H_{IP}(Z)$ shown in FIG. 8 and represented by $$H_{IP}(Z) = \{(1+Z^{-1})/2\}H'(Z) \tag{2}$$

The phase-corrected green color imaging output signal $S_G'$, produced at the interpolating section 7 and indicated as the green-color interpolation data $D_G'$, represents a sampling signal having the frequency fs and in phase with both the red-color imaging output signal $S_R$ and the blue color imaging output signal $S_B$.

Thus the green-color image pickup output signal $S_G'$ may be digitally processed, such as by gamma correction, at the clock frequency of fs, by using color data $D_R$, $D_B$ indicating the red-color image pickup output signal $S_R$ and the blue-color image pickup output $S_B$ and the green-color interpolating data $D_G'$.

That is, in the present embodiment, in the course of data processing for the green-color interpolation data $D_G'$, red-color data $D_R$ and the blue-color data $D_B$, the image enhancement section 9 sums the phase-corrected green-color imaging output signal $S_G'$ on one hand and the red-color imaging output signal $S_R$ and the blue-color imaging output signal $S_B$ on the other at a ratio of 1:1. In this manner, it is possible to cancel aliasing components having a frequency in the range of 0 to fs/2, as shown at D in FIG. 5. From this summation signal, an image enhancement signal $S_{IE}$ having the frequency spectrum as shown at E in FIG. 5 is formed.

In the processing sections 10R, 10G and 10B, the green-color interpolation data $D_G'$, the red-color data $D_R$ and the blue-color data $D_B$ are subjected to, above all, gamma correction and profile emhancement by the image enhancement signal $S_{IE}$.

In the matrix processing section 11, data of a luminance signal Y and chrominance signals I and Q are formed on the basis of the green interpolation data $D_G'$ red-color data $D_R$ and the blue-color data $D_B$, supplied from the processing sections 10R, 10G and 10B, so as to be then supplied to an encoder 12. From the data of the luminance signal Y and the chrominance signals I and Q, the encoder 12 forms an outputs color video data conforming to for example, a so-called $D_2$ format.

It is noted that the luminance signal Y formed by summing the phase-corrected green color imaging output signal $S_G'$ to the red color image pickup output signal $S_R$ and the blue color image pickup output signal $S_B$ at the predetermined ratio contains a minor amount of the aliasing components in the frequency range of 0 to fs/2, as shown at F in FIG. 5. However, signal deterioration may be reduced by the image enhancement operation by the image enhancement signal $S_{IE}$ that are free from the aliasing components in the frequency range of 0 to fs/2, as mentioned hereinabove.

In the above image enhancement section 9, the phase-corrected green color image pickup output signal $S_G'$ on one hand and the red-color image pickup output signal $S_R$ and the blue-color image pickup output signal $S_B$ on the other may be summed together at such a level ratio that the aliasing components in the luminance signal Y into the frequency range of 0 to fs/2 may be cancelled, and the image enhancement signal $S_{IE}$ may be formed from this summation signal.

In the above embodiment, the green color interpolation data $D_G'$ corresponding to the phase-corrected green-color image pickup output signal $S_G'$ having the same phase as the sampling phase of each of the red-color image pickup output signal $S_R$ and the blue-color image pickup output signal $S_B$ is formed from the green-color data $D_G$ digitized from the greencolor image pickup output signal $S_G$ by the above described phase correction performed at the interpolating section 7. However, the present invention is not limited to the above embodiment. For example, an interpolating section may be provided for subjecting the red color data $D_R$ digitized from the red-color image pickup signal $S_R$ and the blue-color data $D_B$ digitized from the blue color image pickup output signal $S_B$ to the interpolating similar to the above mentioned phase correction for the green color data $D_G$ to form the interpolation data for the respective colors corresponding to the phase-corrected red-color and blue-color image pickup output signals having the same phase as the sampling phase of the green-color image pickup output signal $S_G$.

FIG. 4A illustrates that the red-color has been subjected to processing through an interpolation section 7A and the green and blue colors pass through delay devices 8G and 8B. FIG. 4B shows the blue-color subject to interpolation section 7B.

In the above described signal processing circuit of the present invention, the processing system in its entirety may be caused to operate at a lower clock rate fs corresponding to the spatial sampling frequency of each of the CCD image sensors 4R, 4G and 4B making up the image pickup section of the solid-sate image pickup device. The interpolating section 7 performing phase correction performs digital data processing of the color data digitized from the image pickup output signal resulting in extremely satisfactory delay and group delay characteristics. The CCD image sensors 4R, 4G and 4B making up the image pickup section may be of the subnyquist system to increase the MTF in the frequency range of 0 to fs/2. Moreover, the aliasing components into the above mentioned frequency range from 0 to fs/2 may be cancelled to produce the imaging output signal of extremely high image quality by the processing corresponding to the spatial pixel shifting method.

In the signal processing circuit of the present invention, the imaging output signals read out at the sampling rate fs from the solid state image sensors for green color, red color and blue color image of the image pickup section, in which the above three solid state image sensors are placed with spatial shifting by one half the repetitive pitch of the pixels, are digitized by analog to digital converting means at the clock rate fs equal to the sampling rate fs. The green color picture imaging output signal or the red color picture image pickup output signal and the blue color picture image pickup output signal, thus digitized by the analog-to-digital converting means, are subjected by interpolating filter means to a sampling phase conversion having a single zero within fs/2 and exhibiting filter characteristics having a passband in the vicinity of 0 to fs/2 to produce a green color picture image pickup output signal having the same phase with the sampling phase of the red-color picture image pickup output signal and the blue-color picture image pickup output signal or the red and blue-color picture image pickup output signals having the same phase as the sampling phase of the green-color picture image pickup output signal.

In the signal processing circuit of the solid-state imaging device of the present invention, the modulation transfer function (MTF) in the frequency range of from 0 to fs/2 can be increased with the solid-state image pickup sensor having the discrete pixel array and adapted for performing the spatial sampling of the object image as the subnyquist system. Also the aliasing components into the frequency range of from 0 to fs/2 may be cancelled by the processing conforming to the spatial pixel shifting method to produce imaging output signals having superior image quality.

Thus, by applying the signal processing circuit to the multi-plate type solid state imaging device for color imaging, it is possible to produce high quality color imaging output signal of high quality containing lesser amounts of folding components.

The second embodiment of the present invention will be explained. This second embodiment is directed to a color television camera into which is incorporated a three-plate solid state imaging device to which the signal processing circuit according to the present invention is applied.

Figure 9:
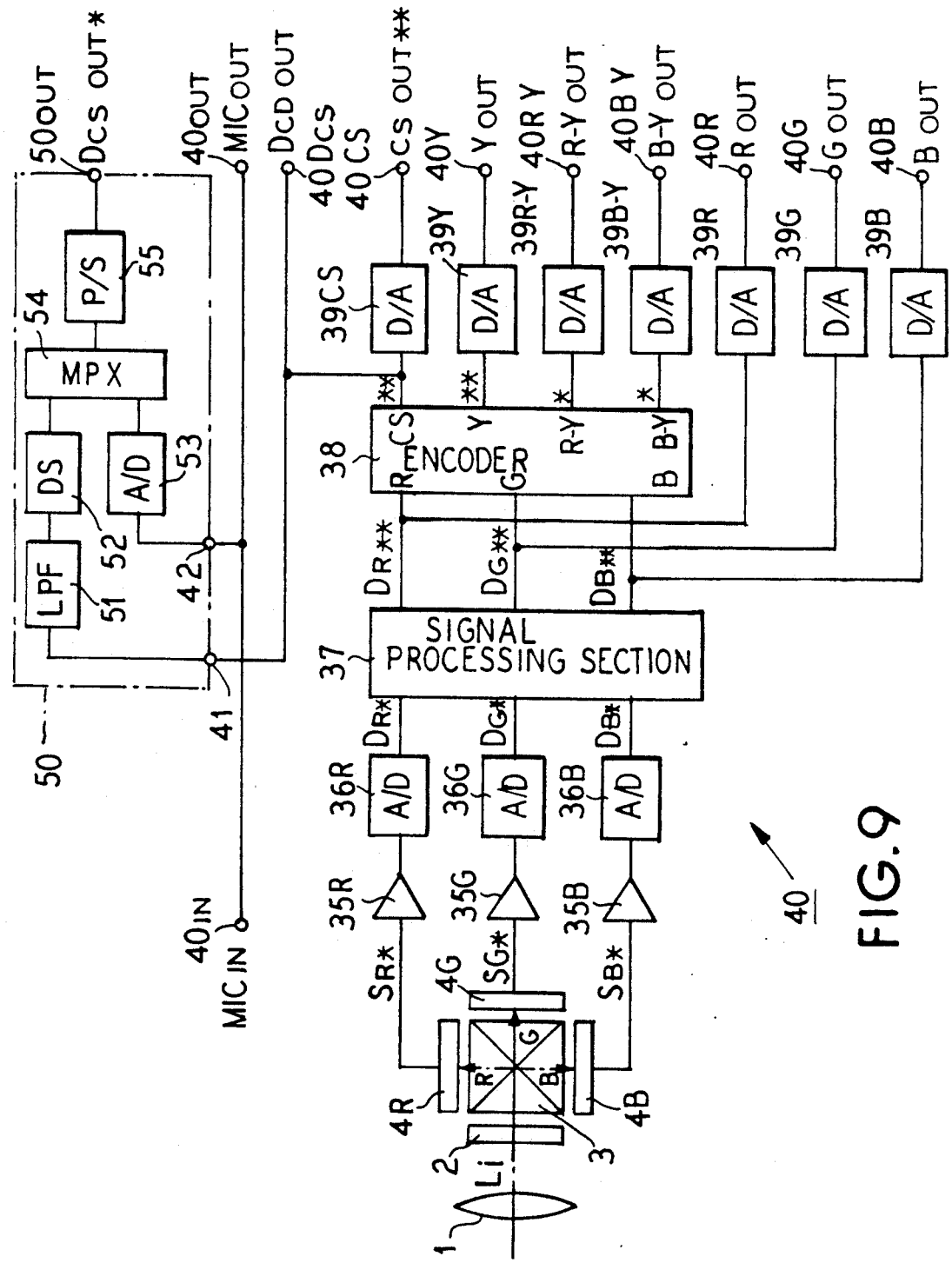
FIG. 9 is a block diagram showing a color television camera according to the present invention.

As shown in FIG. 9, this color television camera device has a three plate type solid state imaging device in which the imaging light Li incident from the imaging lens 1 by way of an optical low-pass filter 2 is separated into three prime-color components R, G and B by a color-separation prism 3 and three-color images of an object are picked up by the three CCD image sensors 4R, 4G and 4B.

The CCD image sensors 4R, 4G and 4B making up the image pickup section of the three-plate type solid-state image pickup device are constructed, similarly to the solid state imaging device explained in the first embodiment, with the use of the spatial pixel shifting method as shown in FIG. 3. That is, the CCD image sensors 4R and 4B for red-color and blue-color image pickup are placed with a shift equal to one half the spatial pixel sampling period $\tau s$. The CCD image sensors 4R, 4G and 4B are driven by a CCD driving circuit, not shown, so that the image pickup electrical charges for the pixels are read out with read-out clocks having the sampling frequency fs equal to four times as high as the color subcarrier frequency or 4fsc.

The three-color images of the object are subjected to spatial sampling at the CCD image sensor 4G for green-color image pickup on the one hand and at the CCD image sensors 4R, 4B for the red-color and blue color image pickup on the other, at the position spatially shifted by $\tau s/2$ from each other. Thus, as may be seen from the spectral components at A in FIG. 5, the sampling frequency components fs of a green color image pickup output signal $S_G$ from the sensor 4G is oppositely phased with respect to the sampling frequency components fs of the red-color and blue-color image pickup output signal $S_R$ and $S_B$ from the sensors 4R, 4B, respectively.

The three-color images of the object are subjected to spatial sampling at the CCD image sensor 4G for green-color image pickup on the one hand and at the CCD image sensors 4R, 4B for the red-color and blue color image pickup on the other, at the position spatially shifted by $\tau s/2$ from each other. In this manner, as may be seen from the spectral components shown at A in FIG. 10, the component of the green color image pickup output signal $S_{G*}$ by the CCD image sensor 4G having the sampling frequency fs is reversed in phase from the components of the red-color and blue color image pickup signals $S_{R*}$ and $S_{B*}$ having the sampling frequency fs.

The image pickup output signals $S_{R*}$, $S_{G*}$ and $S_{B*}$, read out from the CCD sensors 4R, 4G and 4B with the read-out clocks at the sampling frequency fs equal to 4fsc, are supplied to analog-to-digital (A/D) converters 6R, 6G and 6B, via buffer amplifiers 5R, 5G and 5B, respectively.

To each of these A/D converters 6R, 6G and 6B, there are applied clocks from timing generators, not shown, having the clock rate equal to the sampling rate for the image pickup output signals $S_{R*}$, $S_{G*}$ and $S_{B*}$, that is, the clock frequency fs equal to 4fsc or the read-out clocks for the CCD image sensors 4R, 4G and 4B. The A/D converters 6R, 6G and 6B directly digitized the image pickup output signals $S_{R*}$, $S_{G*}$ and $S_{B*}$ at the clock rate fs equal to 4fsc to produce color data $D_{R*}$, $D_{G*}$ and $D_{B*}$ having the same output spectra as the spectra shown at A in FIG. 10.

The color data $D_{R*}$, $D_{G*}$ and $D_{B*}$, produced by the A/D converters 6R, 6G and 6B, are supplied to a signal processing section 7.

Figure 11:
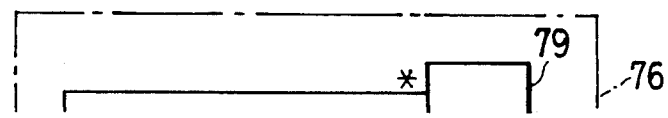
FIG. 11 is a block diagram showing the construction of a signal processing section employed in the color television camera according to the present invention.
Figure 11:
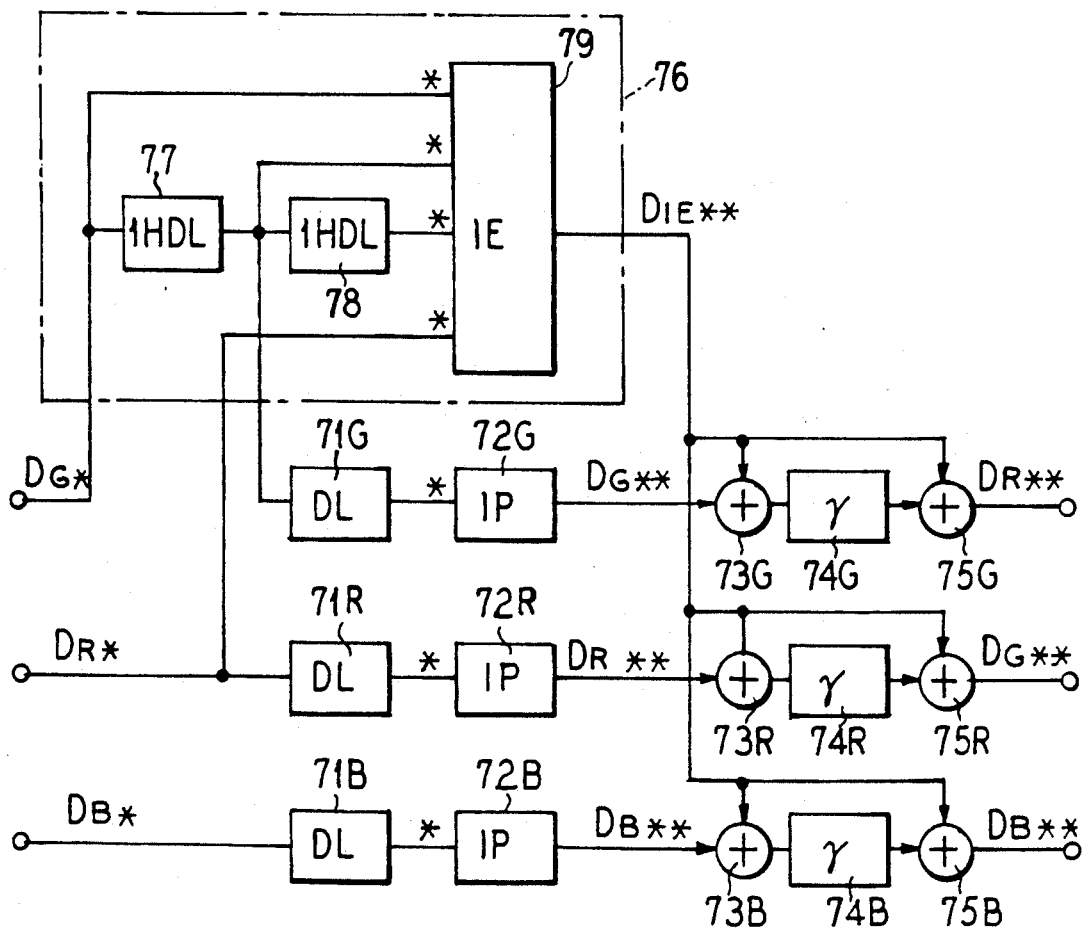

Referring to FIG. 11, the signal processing section 7 includes interpolating sections 72R, 72G and 72B supplied with the color data $D_{R*}$, $D_{G*}$ and $D_{B*}$ obtained at the D/A converters 6R, 6G and 6B via delay circuits 71R, 71G and 71B, first adders 73R, 73G and 73B supplied with the interpolated color data $D_{R}$, $D_{G}$ and $D_{B**}$ from the interpolating sections, gamma correction circuits 74R, 74G and 74B supplied with summation output data from these first adders 73R, 73G and 73B, second adders 75R, 75G and 75B supplied with the gamma-corrected color data from the gamma correction circuits 74R, 74G and 74B, and an image enhancement section 76 supplied with the color data $D_{R*}$ and $D_{G*}$ produced by the A/D converters 6R and 6G.

The image enhancement section includes series connected first and second 1H delay circuits 77 and 78, and an image enhancement data forming circuit 79. The circuit 79 is directly supplied with green-color data $D_{G*}$ produced at the A/D converter 6G. The circuit 79 is supplied not only with the green color data $D_{G*}$ via first 1H delay circuit 77 but also with the green color data $D_{G*}$ via first and second 1H delay circuit 77 and 78. The image enhancement data forming circuit 79 is also directly supplied with the green-color data $D_{R*}$ produced at the A/D converter 6R. From the color data $D_{R*}$ and $D_{G*}$ at the clock rate fs of 4fsc, produced at the A/D converters 6R and 6G, the circuit 70 forms image enhancement data $D_{IE**}$ having a clock rate 2fs which is twice as high as the clock rate fs, or 8fsc.

The image enhancement data $D_{IE**}$ at the clock rate 2fs equal to 8fsc, produced by the circuit 79, are supplied from the enhancement section 76 to the first adders 73R, 73G and 73B and to the second adders 75R, 75G and 75B.

The interpolating sections 72R, 72G and 72B interpolates the color data $D_{R*}$, $D_{G*}$ and $D_{B*}$ at the clock rate fs or 4fsc from the A/D converters 6R, 6G and 6B to form color data $D_{R**}$, $D_{G*}$ and $D_{B}$ having the clock rate 2fs that is twice the clock rate fs, or 8fsc. The interpolating sections 72R, 72G and 72B transmit the color data $D_{R}$, $D_{G}$ and $D_{B}$ at the clock rate of 2fs to the first adders 73R, 73G and 73B.

The first adders 73R, 73G and 73B sum the image enhancement data $D_{IE}$ at the clock rate of 2fs from the enhancement section 76 to the color data $D_{R}$, $D_{G}$ and $D_{B}$ at the clock rate 2fs from the interpolating sections 72R, 72G and 72B by way of an image enhancement operation. The first adders 73R, 73G and 73B transmit the enhanced color data $D_{R}$, $D_{G}$ and $D_{B**}$ to the gamma correction circuit 74R, 74G and 74B.

The gamma correction circuits 74R, 74G and 74B perform gamma correction of the enhanced color data $D_{R}$, $D_{G}$ and $D_{B}$ from the first adders 73R, 73G and 73B to transmit the gamma corrected color data $D_{R}$, $D_{G}$ and $D_{B}$ to the second adders 75R, 75G and 75B.

The second adders 75R, 75G and 75B sum the image enhancement data $D_{IE}$ supplied from the enhancement section 76 at the clock rate of 2fs to the gamma corrected color data $D_{R}$, $D_{G}$ and $D_{B}$ from the gamma correction circuits 74R, 74G and 74B by way of a further image enhancement operation.

Thus the signal processing section 37 outputs the gamma corrected and enhanced color data $D_{R}$, $D_{G}$ and $D_{B**}$ having the clock rate 2fs. The color data outputted from the signal processing section 37 at the clock rate of 2fs are transmitted to the color encoder 8 and digital-to-analog (D/A) converters 39R, 39G and 39B.

The D/A converters 39R, 39G and 39B convert the high-resolution color data $D_{R}$, $D_{G}$ and $D_{B**}$ supplied with the clock rate of 2fs from the signal processing section 37 into analog three-color image pickup output signals $R_{OUT}$, $G_{OUT}$ and $B_{OUT}$ which are outputted at the signal output terminals 40R, 40G and 40B.

Figure 12:
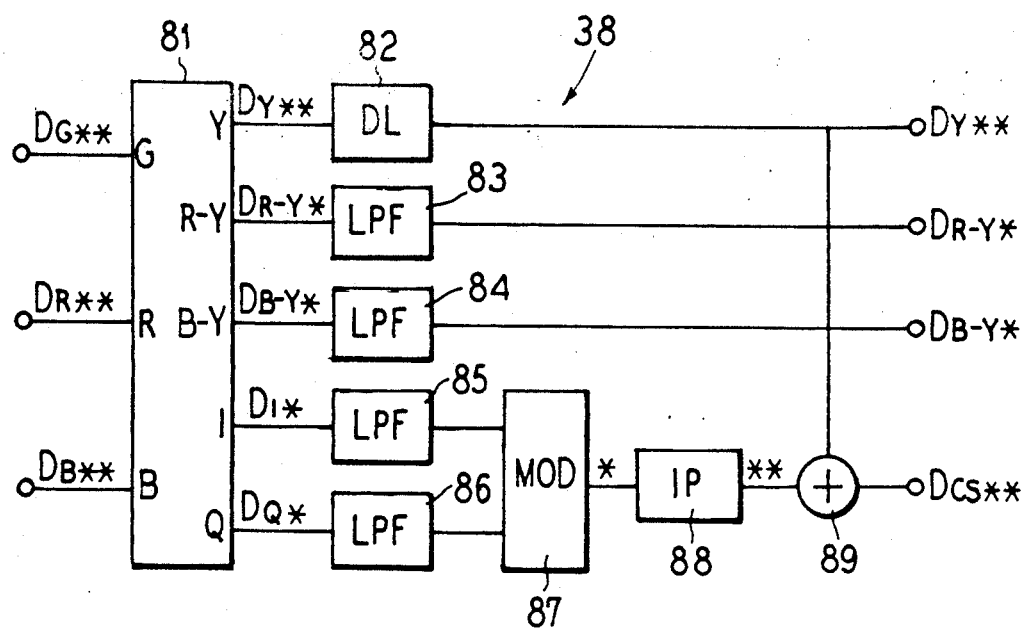
FIG. 12 is a block diagram showing the construction of a color encoder employed in the color television camera according to the present invention.

Referring to FIG. 12, the color encoder 38 includes a matrix circuit 81 supplied with the color data $D_{R}$, $D_{G}$ and $D_{B}$ from the signal processing section 37 at the clock rate of 2fs, a delay circuit 82 supplied with luminance signal data $D_{Y}$ formed by the matrix circuit 81, low pass filters 83, 84, 85, 86 supplied with chrominance signal data $D_{R-Y*}$, $D_{B-Y*}$, $D_{I*}$ and $D_{Q*}$ formed by the matrix circuit 81, a modulation circuit 87 supplied with $D_{I*}$, $D_{Q*}$ formed by the matrix circuit 81, via low pass filters 85 and 86, an interpolating circuit 88 supplied with the modulation output data formed by the modulation circuit 87, and an adder 89 supplied not only with interpolation output data formed by the interpolation circuit 87 but also with the luminance signal data $D_{Y**}$ formed by the matrix circuit 81 via the delay circuit 82.

By the matrix arithmetic operation of the color data $D_{R}$, $D_{G}$ and $D_{B}$ at the clock rate of 2fs, the matrix circuit 81 forms the luminance signal data $D_{Y}$ having the clock rate of 2fs and chrominance signal data $D_{R-Y*}$, $D_{B-Y*}$, $D_{I*}$ and $D_{Q*}$ having the clock rate of fs. The luminance signal data $D_{Y}$, formed by the matrix circuit 81 at the clock rate of 2fs correspond to the luminance signal $Y^{}$ having the frequency distribution as shown at B in FIG. 10.

The color encoder 38 outputs the luminance signal data $D_{YII}$, as the component color image data for the color data $D_{R}$, $D_{G}$ and $D_{B**}$, from the matrix circuit 81 by way of the delay circuit 82, while outputting the chrominance signal data $D_{R-Y*}$, $D_{B-Y*}$ from the matrix circuit 81 via the low pass filters 83 and 84. A delay associated with the low pass filters 83 and 84 is applied by the delay circuit 82 to the luminance signal data $D_{Y**}$.

The modulation circuit 87 in the color encoder 38 performs direct current two-phase modulation of $D_{I*}$ and $D_{Q*}$ supplied from the matrix circuit 81 by way of the low pass filters 85 and 86. The modulated output data from the modulation circuit 87 correspond to the modulated chrominance signals having the frequency distribution containing odd number order harmonics at the color subcarrier frequency fsc as shown at C in FIG. 10.

The interpolating section 88 performs digital filtering of the modulated output data from the modulation circuit 87 for extracting the fsc component and 7fsc component in accordance with filter characteristics shown at D in FIG. 10 to produce modulated chrominance signal data having the frequency distribution shown at E in FIG. 10, with the clock rate 2fs corresponding to 8fsc.

The color encoder 38 sums the luminance signal data $D_{Y}$ outputted from the matrix circuit 81 via the delay circuit 82 and the modulated chrominance signal data formed by interpolating circuit 88 at the clock rate of 2fs at the adder 89, to form a digital composite video signal $D_{CS}$ having the frequency distribution shown at F in FIG. 10.

The color encoder 38 processes the color data $D_{R}$, $D_{G}$ and $D_{B}$ at the clock rate of 2fs, which have undergone gamma correction and image enhancement by the signal processing section 37, to produce high resolution luminance signal data $D_{Y}$ with the clock rate of 2fs, component color image data formed by the chrominance signal data $D_{R-Y*}$ and $D_{B-Y*}$ at the clock rate of fs, and a high resolution digital composite video signal $D_{CS**}$ at the clock rate of 2fs.

The component color image data outputted from the color encoder 38, that is the luminance signal data $D_{Y**}$ and the chrominance signal data $D_{R-Y*}$ and $D_{B-Y*}$, are supplied to digital-to analog (D/A) converters 39Y, 39R-Y and $39_{B-Y}$.

The D/A converters 39Y, 39R-Y and 39B-Y convert the luminance signal data $D_{Y**}$ and the chrominance signal data $D_{R-Y*}$ and $D_{B-Y*}$ into analog component color video signals $Y_{OUT}$, R-$Y_{OUT}$ and B-$Y_{OUT}$ which are outputted at signal output terminals 40Y, 40R-Y and 40B-Y.

The digital composite video signals $D_{CS**}$ outputted from the color encoder 38 are supplied to a digital-to-analog converter 39CS while being supplied to a first adapter connection terminal 41 and a signal output terminal $40D_{CS}$.

The D/A converter 39CS converts the high resolution digital composite video signal $D_{CS**}$ at the clock rate of 2fs into analog composite video signals $CS_{OUT}$ which are outputted at a signal output terminal 40CS.

The color television camera of the present embodiment is provided with an input terminal 40IN, an output terminal 40OUT and a second adapter connection terminal 42, connected to an audio signal line for audio signals produced at a microphone, not shown.

The color television camera has a camera adapter 50 which is separably connected to a main body of the camera 40 outputting a digital composite video signal $D_{CSOUT**}$ at the clock rate of 2fs from a signal output terminal 40DCS.

The camera adapter 50 is provided with a digital low pass filter 51 supplied with the digital composite video signal $D_{CSOUT**}$ at the clock rate of 2fs from the main body 40 via the first adapter connection terminal 41, a rate conversion circuit 52 supplied with the digital composite video signal $D_{CSOUT}$ via the digital low pass filter 51, an analog-to-digital (A/D) converter 53 supplied with microphone input audio signals from the main body 50 via the second adapter connection terminal 52, a multiplexor 54 selecting the converted output data from the rate conversion circuit 52 and the converted output data from the A/D converter 53, and a parallel/-serial (P/S) converter 55 for converting the output data of the multiplexor 54 into corresponding serial data.

The digital low pass filter 51 has filter characteristics shown at G in FIG. 10 such that the bandwidth of the digital composite video signal $D_{CSOUT}$ supplied from the main body 50 via the first adapter connection terminal 51 at the clock rate of 2fs is limited to the range of not more than approximately fs/2. The rate conversion circuit 52 samples down the filter output, shown at H in FIG. 10, which is the $2f_{SC}$ digital composite video signal $D_{CSOUT}$ limited in bandwidth to not more than about fs/2, to produce the fs digital composite video signal $D_{CSOUT}$ as shown at I in FIG. 10.

The A/D converter 53 digitizes the microphone input audio signals supplied from the main body 50 via the second adapter connection terminal 52 to form digital audio signal data.

The multiplexor 54 switches between the converted output data from the rate conversion circuit 52, that is, the digital composite video signal $D_{CSOUT*}$ having the clock rate of fs and the converted output data from the A/D converter 53, that is the aforementioned digital audio signal data, at a predetermined timing, to affix the digital audio signal data to the digital composite video signal $D_{CSOUT*}$. The digital composite video signal $D_{CSOUT*}$, to which the digital audio signal data have been affixed by the multiplexor 54, is supplied to the P/S converter 55, where it is converted into serial data which are outputted at a data output terminal $50_{OUT}$.

With the color television camera of the present embodiment, the color data $D_R$, $D_{G*}$ and $D_{B*}$, obtained by digitizing the three color image pickup output signals $S_{R*}$, $S_{G*}$ and $S_{B*}$ read out from the three CCD image sensors 4R, 4G and 4B by the A/D converters 36R, 36G and 36B at the clock rate equal to the sampling rate fs, are subjected to image enhancement and gamma correction at the signal processing section 37 operating at the clock rate 2fs which is twice as high as the clock rate fs, to form 2fs digital composite video signal $D_{CSOUT}$ by the color encoder 38, which 2fs digital composite video signal $D_{CSOUT}$ is then converted by the D/A converter 39CS into a corresponding analog signal, so that the high quality analog composite video signal $CS_{OUT}$ having superior MTF characteristics and containing lesser amounts of aliasing components may be produced at the signal output terminal 40CS of the main body 40.

The camera adapter 50, separably connected to the main body 40, is so arranged and constructed that the bandwidth of the digital composite video signal $D_{CSOUT**}$ obtained at the main body 50 at the clock rate of 2fs, is limited by the digital low pass filter 51 to not more than about fs/2 to produce the fs digital composite video signal $D_{CSOUT^*}$ at the rate converter 52, so that the high-quality digital composite video signals $D_{CSOUT^*}$ having satisfactory MTF characteristics and containing lesser amounts of the aliasing components.

In the present illustrative embodiment, the camera adapter 50, comprised of the digital low pass filter 51 and the rate converter 52 adapted for converting the 2fs clock rate digital composite video signal $D_{CSOUT^{**}}$ formed by the main body 40 is separably connected to the main body 40, the functional block of the camera adapter 50 may be permanently provided at the main body 40. Also, while the clock rate fs for A/D conversion is selected to be twice as high as the color subcarrier frequency fsc, or 4fsc, the clock rate fs may be set at a desired frequency other than 4fsc.

According to the above described second embodiment of the signal processing circuit for the solid-state image pickup device and the color television camera of the present invention, with the solid-state image sensor having a discrete pixel array obtained upon spatial sampling of the object image as the subnyquist system, high-quality digital composite video signal at the 2fs clock rate which has satisfactory MTF characteristics within the frequency range of 0 to fs/2 and which is free of aliasing components into the frequency range of 0 to fs/2, may be produced by the digital color encoder.

The 2fs clock rate digital composite video signals from the color encoder are limited to a bandwidth of not more than about fs/2 by the digital low pass filter and subsequently converted by the rate converter into the digital composite video signals having the clock rate fs to produce high-quality digital composite video signals having satisfactory MTF characteristics and containing lesser amounts of the digital composite video signals.

Also the signal processing circuit of the solid-state image pickup device is provided with digital-to analog converting means for converting the 2fs clock rate digital composite video signals from the color encoder into analog composite video signals whereby to produce the high-quality digital and analog composite video signals having satisfactory MTF characteristics and containing lesser amounts of aliasing components.

What is claimed is:

1. A signal processing circuit for a solid-state image pickup device comprising
    analog-to-digital converting means for digitizing image pickup output signals read out at a sampling rate fs from a solid-state image sensor for green-color image pickup, a solid-state image sensor for red-color image pickup and a solid-state image sensor for blue-color image pickup of an image pickup section, at a clock rate equal to a sampling rate fs, said solid-state image sensor for green-color image pickup being arrayed with a spatial shift by one half the pixel arraying pitch with respect to said solid-state image sensors for red-color and blue-color image pickup, and
    interpolating filter means for performing sampling phase conversion for coinciding the sampling phase of the image pickup output signals digitized by said analog to digital converting means and having the clock rate fs,
    whereby the image pickup output signals having a coincident sampling phase are formed at the same clock rate as that of said analog-to-digital converting means.

2. The signal processing circuit according to claim 1 wherein said interpolating filter means is formed by a digital filter defined by the same clock rate as the clock rate of said analog-to digital converting means, said digital filter having a single zero in fs/2 with respect to the green-color image pickup output signal or the red-color image pickup output signal and the blue color image pickup output signal and having a passband in the range from 0 to fs/2.

3. The signal processing circuit according to claim 2 wherein said interpolating filter means performs sampling phase conversion of the green color image pickup output signal digitized by said analog-to-digital converting means.

4. The signal processing circuit according to claim 2 wherein said interpolating filter means performs sampling phase conversion of the red color and blue-color image pickup output signals digitized by said analog-to-digital converting means.

* * * * *